Patented Sept. 7, 1954

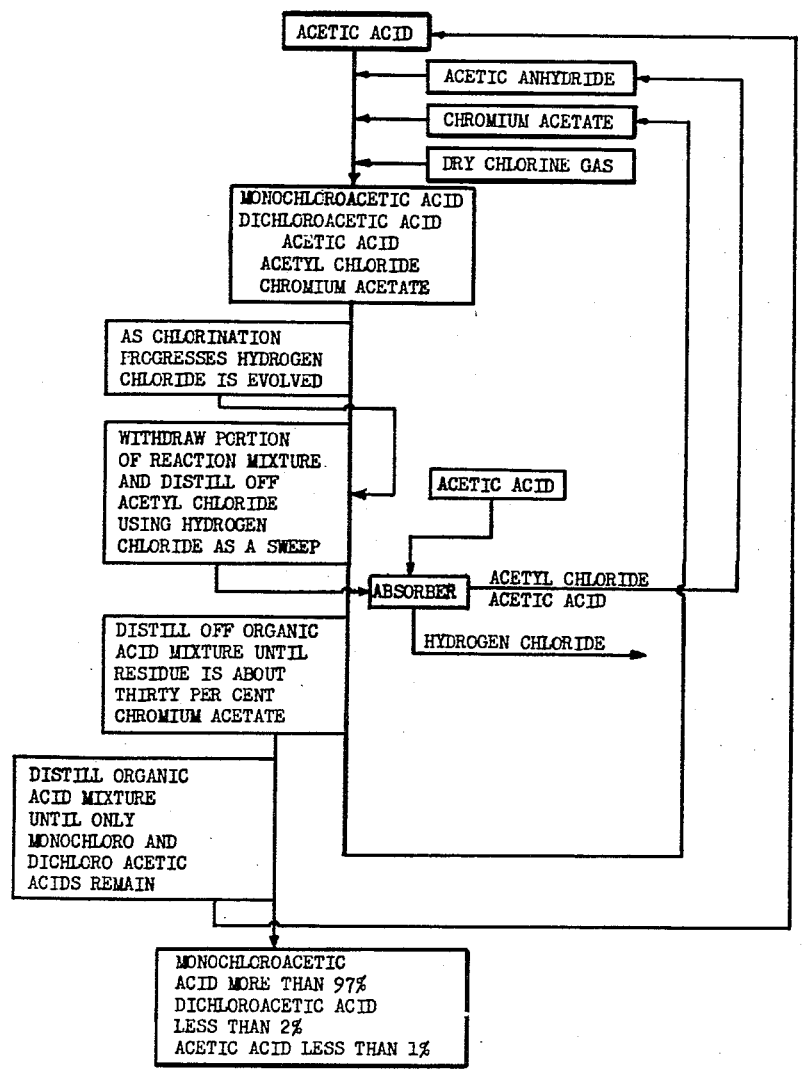

2,688,634

UNITED STATES PATENT OFFICE 2,688,634

MANUFACTURE OF MONOCHLOROACETIC ACID

John T. Pinkston, Jr., Euclid, Ohio, assignor, by mesne assignments, to New York Ohio Chemical Corporation, Lewiston, N. Y., a corporation of New York Application June 30, 1950, Serial No. 171,465

9 Claims. (Cl. 260—539)

This invention relates to the preparation of monochloroacetic acid and more especially to a process wherein the formation of dichloroacetic acid is minimized to such an extent that for many uses no separation of dichloroacetic acid from the product is necessary.

I am aware that prior to my invention, it has been customary to chlorinate acetic acid by passing in chlorine while maintaining a small concentration of acetyl chloride in the reaction mixture. In some cases the acetyl chloride has been formed in situ by the addition of such materials as acetic anhydride, phosphorus trichloride, thionyl chloride or sulfur monochloride to the reaction mixture, while in others acetyl chloride is added directly. This process, however, has been characterized in commercial practice by the production of relatively large proportions of dichloroacetic acid, ordinarily in the range of 2.5 to 10%. In ordinary commercial usage, it is common, today, to require a dichloroacetic acid content of 2% or less and as a result separation procedures have been necessary. Obviously a great saving in production cost could be achieved if the formation of dichloroacetic acid could be so far suppressed as to be, consistently, well within the specification requirement without the necessity for separation of the dichloroacetic from the monochloroacetic acid.

While acetyl chloride is the actual generally effective catalyst, it is possible that acetic anhydride can function without first being converted to acetyl chloride. In any event, it is immaterial whether acetyl chloride or acetic anhydride be added to the reaction mixture. The result is the same in either case. Probably the acetic anhydride is first converted into acetyl chloride or largely so and thus is an indirect catalyst. According to the usually accepted theory, the major reaction is as follows:

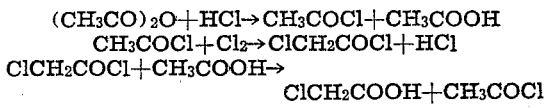

but some monochloroacetic acid may also be made via the following route:

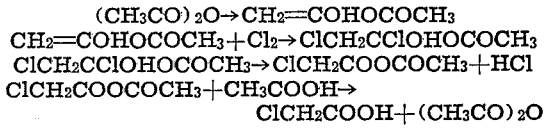

Very likely both types of mechanism proceed to some extent.

Dichloroacetic acid has been considered to be formed in a similar manner, with chloroacetyl chloride or chloroacetic anhydride as intermediate. While this would be a rather obvious conclusion to draw, I have for some time suspected the truth to be otherwise and have now discovered that production of dichloroacetic acid in this reaction is, to a very considerable extent, dependent upon the presence of a catalytic agent for dichlorination, formed in the course of the reaction, an organic peroxide as indicated hereinafter. This discovery grew out of consideration of the fact that the rate of formation of dichloroacetic acid is essentially independent of the amount of monochloroacetic acid present and the difference in behavior between fresh acetic acid and unreacted acetic acid from a previous batch. In the case of fresh acetic acid no dichloroacetic acid is formed until there is time for build-up of the dichlorination catalyst, whereas in the case where unreacted acetic acid from a previous batch is used the formation of dichloroacetic acid begins immediately. If dichloroacetic acid were being produced from monochloroacetic acid, its rate of formation should increase in linear proportion to the increase in concentration of the latter. Actually the rate of formation of dichloroacetic acid is essentially unrelated to the concentration of the monochloro compound in the reaction mixture. Reference is here had to the conventional process above described wherein the organic peroxide dichlorination catalyst concentration is allowed to build up without inhibition. In all processes with which I am familiar, there appears to be inevitably a sharp build-up of higher chlorinated products, chiefly dichloroacetic acid toward the end of chlorination. I do not claim to obviate this build-up entirely, but I do suppress it to a point sufficiently near complete chlorination for practical purposes.

Heisel, U. S. Patent No. 2,168,260, deals with the problem of preventing polychlorination in the chlorination of various acids including acetic, making use of a complex counter current system which takes the reaction mixture away to a still as fast as reaction occurs. He says that polyhalogenation can be completely prevented but this language is not to be interpreted literally inasmuch as his Example 5 which deals with acetic acid shows a little more than two per cent of dichloroacetic in the product. It seems probable that the peroxide concentration built up and was not destroyed by the repeated distillation, just as in the case of the normal commercial process.

Hammond, U. S. Patent No. 2,503,334, chlorinates acetic acid with a quite low concentration of acetyl chloride and obtains a crystalline product of 97.5% purity. He does not specify what the impurities are but it may be assumed that only a portion of the remaining 2.5% is dichloroacetic acid. It is to be noted, however, that Hammond nowhere mentions the problem of dichlorination and makes use of a test (titration with caustic soda) which does not distinguish between monochloroacetic acid and an equimolecular mixture of acetic and dichloroacetic acids, both of which latter are probable contaminants of his crystals. Having, thus, no information from Hammond's specification, it is to be assumed that he produced the usual amount of dichloroacetic acid which was mostly left in the mother liquor on crystallization and partly occluded in the crystals of the product and adherent thereto.

I have chlorinated acetic acid and crystallized monochloroacetic acid from the gross reaction product as described by Hammond. In this way a crystalline product with essentially the purity described by Hammond was obtained. (The product was analyzed by a procedure which determines separately the proportions of acetic acid, monochloroacetic acid, and dichloroacetic acid.) The mother liquor from the crystallization, however, contained dichloroacetic acid in such quantity as to show that in the gross reaction product there was approximately one part of dichloroacetic acid for every twenty parts of monochloroacetic acid.

This brief review of the prior art points up sharply the principal objective of my invention which is actually to avoid the production of dichloroacetic acid in harmful amount so that it will not be necessary to separate it from monochloracetic acid either by fractional distillation under reduced pressure in a many-plate column, or, like Hammond, by crystallization, leaving a mother liquor which cannot be recycled without expensive treatment. In other words, it is my purpose to provide a process which is characterized by a very high yield, above 98%, of chlorinated product so nearly pure monochloroacetic acid that no further purification is necessary. It is to be understood that yield is based on that portion of the acetic acid which reacts and that conversion, the proportion of acetic acid which reacts, may be much less, typically in the order of 80 to 85%. Although the boiling points at atmospheric pressure of monochloroacetic acid and dichloroacetic acid are rather close together (189° and 194.5° C.), at lower temperatures the vapor pressures of the two acids differ enough to permit their separation in a very good fractionating column operating under reduced pressure. When recourse is had to crystallization, there is loss in yield due to the monochloroacetic acid associated with the dichloroacetic acid in the mother liquor which finally is discarded, as well as the loss due to the undesired formation of dichloroacetic acid itself. Thus, both of these purification measures are expensive from the standpoint of processing cost, as well as the attendant loss in yield of desired product. It is my purpose to work out a process whereby the organic reaction product, for all practical purposes, can be regarded as a mixture of unchlorinated material and monochlorinated material, and only a relatively simple separation between these two is necessary.

In these operations where an ionic agent capable of inhibiting the formation of dichloroacetic acid is used, and even where no ionic agent is employed, it is advantageous to remove all acid chlorides from the gross reaction product before any attempt is made to separate unchlorinated material from that which has been chlorinated. I have found that the presence of acetyl chloride causes difficulties in the fractionation of the organic reaction product under reduced pressure. First, the acetyl chloride, with its relatively low boiling point of 51°–52° C. at atmospheric pressure, is decidedly difficult to condense under the reduced pressure. This leads to difficulties in maintaining the proper vacuum, to corrosion of the vacuum producing pumps or steam jets, and to loss of valuable material which could be recycled to the chlorination step for further use. Second, there is some tendency for acetyl chloride in hot mixtures, and a decided tendency in cold mixtures, to react with acetic acid to produce hydrogen chloride and acetic anhydride. Similarly it may react with monochloroacetic acid to produce hydrogen chloride and a mixed anhydride of acetic acid and monochloroacetic acid.

These products boil at temperatures intermediate between acetic acid and monochloroacetic acid. When they are present there is no longer the relatively great difference in boiling points of the desired product and material to be recycled. This makes necessary a much more efficient distilling column and much greater care in its operation. This can be more readily appreciated when the boiling points at atmospheric pressure of the various materials are considered, as follows:

| Material: | Boiling point (atm. pres.), °C. |
|---|---|
| Acetic acid | 118.1 |
| Acetic anhydride | 139.5 |
| Acetic-chloroacetic anhydride | 168–170 |
| Chloroacetic acid | 189 |

The acetyl chloride and anhydrides resulting from its reactions with acetic acid and chloroacetic acid also interfere seriously with the removal of monochloroacetic acid from the organic reaction product when crystallization is the means chosen for separation. Instead of a two component system, from which relatively pure monochloroacetic acid can be crystallized, there is at hand a multicomponent system whose phase relations are considerably more complex and less easily controlled.

Accordingly, I have found it best to strip substantially all the acid chlorides from the gross reaction product as it comes from the chlorinator. This can be done fairly satisfactorily by a short distillation at atmospheric pressure, if there is sufficient unreacted acetic acid in the mixture to permit the removal of substantially all the acetyl chloride before the temperature in the stillpot becomes too high. It is much better, however, to pass the liquid gross reaction product through a packed tower at a temperature above the boiling point of acetyl chloride, preferably in the range from 80° C. to 120° C., and blow hydrogen chloride countercurrent to it. By this means, the acetyl chloride and all residual anhydrides which are converted to acetyl chloride by the HCl are eliminated. The acetyl chloride stripped out by the hydrogen chloride is recovered by absorption in cold glacial acetic acid for further use.

As stated before, it is best to carry out this acetyl chloride removal operation on the gross reaction product which still contains the ionic dichlorination inhibiting agent. It can, however, be done still with considerable advantage after the organic part of the gross reaction mixture has been separated from the ionic inhibiting agent by distillation.

So far as I am aware, no one has heretofore made possible such an effective and simple cycle. The key to the result is, of course, the suppression of the peroxide formation to a degree to avoid amounts of dichloroacetic acid great enough to require its removal. Upon becoming convinced that the mechanism of dichlorination was different from that of monochlorination, I strongly suspected the formation of peroxide as the most likely type of organic catalyst to be formed under the conditions of the process. While I was a long time arriving at this point, known agents for the destruction of organic peroxides were not far to seek. I promptly tried manganese acetate and found it effective. I, then, turned to other compounds which are ionized in acetic acid and found them also effective, not only metal salts but acids such as sulfuric and phosphoric. I then tried materials not ionized in acetic acid, such as boric acid, lead and mercury salts, carbon tetrachloride, tetrachlorobenzene, etc., and found them ineffective. It seems that here as in many other cases, the destruction of peroxides by such agents is an ionic phenomenon. Of course, adequate solubility in glacial acetic acid is requisite to having a sufficient concentration of ions. Compounds which are insoluble in this medium naturally are excluded. The degree of solubility need not be more than from about .05 to 1.0 mol per cent based on glacial acetic acid, however, since concentrations of the peroxide destroying agents of that order are effective.

The essential character of my process can be seen most readily by reference to the figure in the accompanying drawing which is a flow sheet showing an illustrative embodiment.

The inhibiting catalyst may be an inorganic acid, such as sulfuric or phosphoric acid, or a salt of a metal such as the sulphate, phosphate, nitrate, acetate or chloride, preferably a chloride or an acetate, since sulfates, phosphate, etc. which are sufficiently soluble would introduce foreign anions unnecessarily. For example, I may make use of an acetate or chloride (or one of the other mentioned salts) of manganese, chromium, calcium, cobalt, nickel, sodium, zinc, barium, posassium, lithium, caesium, magnesium, vanadium, copper, silver, cadmium, or tin. Lead and mercury compounds are not effective and the same is true of boric acid, lead chloride not being sufficiently soluble and the mercury compounds and boric acid not being ionized to any substantial extent in glacial acetic acid.

It is clear from the examples below that I am able to suppress the formation of dischloroacetic acid under the conditions of the preferred reaction above described. By selecting favorable conditions, I am able to produce monochloroacetic acid containing no more than about $1\frac{1}{2}\%$ dichloroacetic acid, under optimum conditions less than 1%, notwithstanding, chloroination is carried on for such period of time that the glacial acetic acid has been converted to the extent of from 60 to 90%.

The chlorination may be carried on in a temperature range from 75° C. to 150° C., preferably from 100° C. to 115° C., the concentration of acetyl chloride being maintained in the order of 10% to 30% by weight based on the acetic acid plus the acetyl chloride and the inhibiting catalyst being present to the extent of from 0.2 to 3.0%, preferably from 0.3 to 3.0%, based on the acetic acid plus the acetyl chloride. The rate of chlorine addition may be about 10% to 20% of the weight of acetic acid per hour.

The following table indicates by way of example the results obtainable with various inhibiting catalysts under various conditions:

| Glacial Acetic Acid, Grams | Acetic Anhydride (90%), Grams | Inhibitor | | Time, Hrs. | Percent Chlorination of the Acetic Acid | Percent Dichloro-Acetic Acid in the product |
|---|---|---|---|---|---|---|
| | | Name | Grams | | | |
| 365 | 150 | $MnAc_2.4H_2O$ | 15 | 7 | 37.9 | 0.97 |
| 365 | 115 | $MnAc_2.4H_2O$ | 15 | 16 | 84.6 | 1.46 |
| 350 | 150 | $CrAc_3.H_2O$ | 15 | 8 | 38 | 0.39 |
| 400 | 100 | $CrAc_3.H_2O$ | 1 | 12 | 70 | 1.69 |
| 392 | 108 | $CrAc_3.H_2O$ | 15 | 14 | 72 | 0.76 |
| 400 | 100 | $CrAc_3.H_2O$ | 15 | 15 | 82 | 0.96 |
| 350 | 150 | $CaAc_2.H_2O$ | 15 | 14 | 51 | 0.47 |
| 250 | 175 | $CoAc_2.4H_2O$ | 41 | $7\frac{1}{2}$ | $49\frac{1}{2}$ | 1.04 |
| 350 | 150 | $NaAc$ | 15 | $15\frac{1}{2}$ | 41 | 0.65 |
| 385 | 100 | $H_2SO_4$ | 15 | 8 | 64 | 0.78 |
| 350 | 150 | $ZnAc_2.2H_2O$ | 15 | $10\frac{1}{2}$ | 36.3 | 1.66 |
| 350 | 150 | $H_3PO_4$ | $17\frac{1}{2}$ | 8 | 56 | 1.45 |
| 400 | 100 | $SnCl_4$ | 15 | 6 | $61\frac{1}{2}$ | 1.52 |
| 400 | 100 | $MnAc_2.4H_2O$ | 1 | 14.5 | 50 | 1.46 |
| 350 | 150 | $MnCl_2.4H_2O$ | 15 | 15.5 | 64 | 1.17 |

The reaction mixture in connection with which the inhibiting catalyst is used consists of a body of glacial acetic acid containing acetyl chloride or acetic anhydride to the extent of about 10% to about 30% by weight together with a stream of chlorine (introduced in gaseous or liquid state) passing therethrough. Also present in the reaction mixture is the dichlorination inhibiting catalyst which may be a compound soluble in glacial acetic acid such as a metal salt or acid which will ionize in glacial acetic acid. Compounds which do not ionize in glacial acetic acid, such as $HgCl_2$, hydrogen chloride, and boric acid have been found not to inhibit the formation of dichloracetic acid.

In the examples shown in the above table, higher polychlorination products were produced only in trace quantities. I have found that there is some correlation between degree of chlorination and proportion of dichloroacetic acid in the product. In a series of determinations on chromium acetate, for example, it was found that up to 70 to 80 per cent chlorination of the acetic acid the percentage of dichloroacetic acid in the product would average about 1%, up to 85 to 90 per cent chlorination, not more than about $1\frac{1}{2}\%$ dichloroacetic acid and at 100% chlorination from $2\frac{1}{2}\%$ to 5% dichloroacetic acid. Accordingly, chlorination should not be carried beyond about 85% and preferably not beyond 80%.

The following specific examples will serve to illustrate the invention:

Example I

Into a reactor equipped with an agitator, gas distributor and reflux condenser were placed 400 parts by weight of glacial acetic acid, 15 parts by weight of chromium acetate hydrate and 100 parts by weight of acetic anhydride (90%). The temperature was brought up to 100° C. and held in the range from 100° C. to 110° C. while chlorine was passed in for a period of 15 hours and 45 minutes at the rate of 80 parts by weight per hour. Acetic anhydride was added at the rate of 8 parts by weight per hour during the chlorination to compensate for the acetyl chloride lost in the exit gas stream. The acetyl chloride content of the gross reaction mixture was then distilled off using hydrogen chloride gas as a sweep. (Hydrogen chloride evolved from the reaction mixture can be used for the sweep, either by storage in the event of a batch process or hydrogen chloride being evolved from a subsequent batch.) Having thus removed the acetyl chloride, the remaining portion of the reaction mixture was distilled under reduced pressure down to a point where the chromium acetate constituted about 30% by weight of the residue. The distillate was then fractionally distilled into a fraction containing substantially only monochloroacetic acid and an acetic acid fraction. The monochloroacetic acid content was found to be about 99.2% of the product, the dichloroacetic acid content was found to be about 0.8% of the product, while the acetic acid content was negligible. It will be understood that certain fractions need to be returned to the process in order to achieve an economic operation. A schematic system illustrating how this can be done is shown in the drawing in the form of a flow diagram illustrating the process in a manner which can be batch procedure but which obviously also can be continuous.

Example II 400 parts by weight of glacial acetic acid together with 15 parts by weight of calcium acetate and 100 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 13 hours and 45 minutes at the rate of 80 parts by weight per hour. Acetic anhydride was added to the rate of 8 parts by weight per hour during the chlorination to compensate for the acetyl chloride lost in the exit gas stream. The acetyl chloride and acetic acid as a first fraction, and monochloroacetic acid and dichloroacetic acid as a second fraction were separated from the calcium acetate by fractional distillation under vacuum through a glass column packed with glass helices, the reaction mixture being thereby separated into a fraction containing components more volatile than monochloroacetic acid and the monochloroacetic acid-dichloroacetic acid fraction. The latter was found to contain about 99.6% of monochloroacetic acid and about 0.4% of dichloroacetic acid. The extent of chlorination was approximately 50%. A little of the second fraction other than inhibitor was left to prevent the inhibitor from sticking to the equipment.

Example III 350 parts by weight of glacial acetic acid together with 15 parts by weight of manganese chloride and 150 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 15 hours and 30 minutes at the rate of 80 parts by weight per hour. Acetic anhydride was added at the rate of 8 parts by weight per hour during the chlorination to compensate for the acetyl chloride lost in the exit gas stream. The components of the reaction mixture were separated as in Example I. The product was found to contain about 98.9% of monochloroacetic acid and about 1.17% of dichloroacetic acid. The extent of chlorination was approximately 64%.

Example IV 385 parts by weight of glacial acetic acid together with 15 parts by weight of sulfuric acid (100%) and 100 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 8 hours and 15 minutes at the rate of 80 parts by weight per hour. Acetic anhydride was added at the rate of 8 parts by weight per hour during the chlorination to compensate for the acetyl chloride lost in the exit gas stream. The components were separated as in Example I. The product was found to contain 99.22% of monochloroacetic acid and 0.78% of dichloroacetic acid. The extent of chlorination was approximately 64%.

Example V 350 parts by weight of glacial acetic acid together with 15 parts by weight of sodium acetate trihydrate and 150 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 7 hours and 30 minutes at the rate of 80 parts by weight per hour. Acetic anhydride was added at the rate of 8 parts by weight per hour during the chlorination to compensate for the acetyl chloride lost in the exit gas stream. The components of the reaction mixture were separated as in Example I. The product was found to contain 98.8% of monochloroacetic acid and 1.16% of dichloroacetic acid. The extent of chlorination was approximately 47.5.

Example VI 350 parts by weight of glacial acetic acid together with 15 parts by weight of chromium sulfate pentahydrate and 150 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 8 hours at the rate of 80 parts by weight per hour. Acetic anhydride was added at the rate of 8 parts by weight per hour during the chlorination to compensate for the acetyl chloride lost in the exit gas stream. The components of the reaction mixture were separated as in Example I. The latter product was found to contain 98.7% of monochloroacetic acid and 1.30% of dichloroacetic acid. The extent of chlorination was approximately 72.5%.

*Example VII*

400 parts by weight of glacial acetic acid together with 15 parts by weight of boric acid ($H_3BO_3$) and 100 parts by weight of acetic anhydride were placed in a reactor equipped with an agitator, gas distributor and reflux condenser. The temperature was brought up to 100° C. and held in the range from 100° C. to 110° C. while dry chlorine gas was passed in for a period of 6 hours at the rate of 80 parts by weight per hour. Acetic anhydride was added at the rate of 8 parts by weight per hour during the chlorination to compensate for the acetyl chloride lost in the exit gas stream. The components of the reaction mixture were separated as in Example I. The latter product was found to contain 96.8% of monochloroacetic acid and 3.17% of dichloroacetic acid. The extent of chlorination was approximately 50.5%.

*Example VIII*

400 parts by weight of glacial acetic acid together with 150 parts by weight of acetic anhydride (no inhibiting catalyst) were placed in a reactor equipped with an agitator, gas distributor and reflux condenser. The temperature was brought up to 100° C. and held in the range from 100° C. to 110° C. while dry chlorine gas was passed in for a period of 15 hours and 30 minutes at the rate of 80 parts by weight per hour. Acetic anhydride was added at the rate of 8 parts by weight per hour during the chlorination to compensate for the acetyl chloride lost in the exit gas stream. The acetyl chloride and acetic acid were separated by distillation from the reaction mixture. The residue was found to contain 95.4% of monochloroacetic acid and 4.3% of dichloroacetic acid. The extent of chlorination was approximately 91%.

*Example IX*

392 parts by weight of glacial acetic acid together with 15 parts by weight of chromium acetate monohydrate and 108 parts by weight of acetic anhydride (90%) were placed in a reactor equipped with an agitator, gas distributor, primary reflux condenser, and a secondary reflux condenser cooled by dry ice to about −70° C. The temperature was brought up to 106° C. and held in the range of 105°–117° C. while chlorine was passed in for 14.5 hours at a rate of about 80 parts by weight per hour. Most of the excess chlorine was swept out by the hydrogen chloride formed in the reaction, but some was condensed, along with the acetyl chloride which passed the primary condenser, and was returned with the acetyl chloride to the reactor. No acetic anhydride other than that in the original charge was used. The components in the reaction mixture were separated as in Example I. It was found that the extent of chlorination was approximately 72%. The product on analysis was found to contain 98.9% monochloroacetic acid, 0.76% dichloroacetic acid, and a trace of acetic acid.

Having thus described my invention, what I claim is:

1. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of a catalyst of the class consisting of the sulphates, phosphates, nitrates, acetates and chlorides of manganese, chromium, calcium, cobalt, nickel, sodium, zinc, barium, potassium, lithium, caesium, magnesium, vanadium, copper, silver and cadmium.

2. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of chromium acetate.

3. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of manganese acetate.

4. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of a catalyst of the class consisting of the sulphates, phosphates, nitrates, acetates, and chlorides of manganese, chromium, calcium, cobalt, nickel, sodium, zinc, barium, potassium, lithium, caesium, magnesium, vanadium, copper, silver, and cadmium, while returning evolved acetyl chloride to the reaction mixture, interrupting the passage of chlorine through a portion of the reaction mixture and interrupting the return of acetyl chloride to said portion, then passing hydrogen chloride gas through said portion at a temperature from 80° C. to 120° C. to distill and sweep out acetyl chloride, and thereafter distilling off from the remainder of said portion a major part of its chlorinated acetic acid and acetic acid content, returning the catalyst-containing residue to the reaction mixture and separating from said part a chlorinated acetic acid content containing substantially only monochloroacetic acid, dichloroacetic acid, and acetic acid, and being less than 2% by weight dichloroacetic acid and more than 97% by weight monochloroacetic acid.

5. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of calcium acetate.

6. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of sodium acetate.

7. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of from about 0.2% to about 3.0% of the combined weight of said substance and said glacial acetic acid of cobalt acetate.

8. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of the order of magnitude of 0.3 to 3.0 per cent of the combined weight of said substance and said glacial acetic acid of a catalyst of the class consisting of the sulfates, phosphates, nitrates, acetates, and chlorides of manganese, chromium, calcium, cobalt, nickel, sodium, zinc, barium, potassium, lithium, caesium, vanadium, magnesium, copper, silver and cadmium.

9. A process for production of monochloroacetic acid of unusually low dichloroacetic acid content comprising passing gaseous chlorine into a mixture of glacial acetic acid and a minor proportion not less than 10% of its own weight plus the weight of said glacial acetic acid of a substance of the class consisting of acetyl chloride and acetic anhydride in the presence of a minor proportion of the order of magnitude of 0.3 to 3.0 per cent of the combined weight of said substance and said acetic acid of chromium acetate.

References Cited in the file of this patent

UNITED STATES PATENTS

| Number | Name | Date |
|---|---|---|
| 2,210,834 | Heisel et al. | Aug. 6, 1940 |
| 2,503,334 | Hammond | Apr. 11, 1950 |
| 2,539,238 | Eaker | Jan. 23, 1951 |

FOREIGN PATENTS

| Number | Country | Date |
|---|---|---|
| 6,031 | Great Britain | of 1910 |
| 621,531 | Great Britain | Apr. 11, 949 |